USO10306881B2

(12) United States Patent
Del Guercio

(10) Patent No.: US 10,306,881 B2
(45) Date of Patent: Jun. 4, 2019

(54) HELICAL DEER RATTLE

(71) Applicant: Andrew Charles Del Guercio, Media, PA (US)

(72) Inventor: Andrew Charles Del Guercio, Media, PA (US)

(*) Notice: Subject to any disclaimer, the term of this patent is extended or adjusted under 35 U.S.C. 154(b) by 0 days.

(21) Appl. No.: 15/637,024

(22) Filed: Jun. 29, 2017

(65) Prior Publication Data
US 2018/0027801 A1    Feb. 1, 2018

Related U.S. Application Data

(60) Provisional application No. 62/368,861, filed on Jul. 29, 2016.

(51) Int. Cl.
| A63H 5/00 | (2006.01) |
| A01M 31/04 | (2006.01) |
| A01M 31/00 | (2006.01) |

(52) U.S. Cl.
CPC .......... *A01M 31/04* (2013.01); *A01M 31/004* (2013.01)

(58) Field of Classification Search
CPC ............................ A01M 31/04; A01M 31/004
USPC ................................... 446/69, 418, 419, 421
See application file for complete search history.

(56) References Cited

U.S. PATENT DOCUMENTS

| 646,403 | A | * | 3/1900 | Klipfel .................. A63F 9/0876 24/31 L |
| 1,168,987 | A | * | 1/1916 | Wixom ................ A63F 9/0876 273/158 |
| 4,610,641 | A | * | 9/1986 | Allen ................... A01M 31/004 428/16 |
| 4,850,928 | A | * | 7/1989 | Stewart ............... A01M 31/004 428/16 |
| 5,000,430 | A | * | 3/1991 | Smith ....................... F16F 1/16 267/148 |
| 5,019,008 | A | | 5/1991 | Hughes |
| 5,334,074 | A | | 8/1994 | Suminski |
| 5,555,664 | A | * | 9/1996 | Shockley ............ A01M 31/008 43/1 |
| D376,555 | S | | 12/1996 | Gebhardt |
| 5,928,056 | A | * | 7/1999 | Molotschko ........ A01M 31/004 446/397 |
| 6,289,626 | B1 | * | 9/2001 | Williams ............ A01M 31/004 43/1 |
| 6,328,626 | B1 | | 12/2001 | Eubanks |
| 6,769,211 | B1 | * | 8/2004 | Baisden .............. A01M 31/004 43/1 |
| 7,281,966 | B2 | | 10/2007 | McQueen |

(Continued)

*Primary Examiner* — Melba Bumgarner
*Assistant Examiner* — Joseph B Baldori
(74) *Attorney, Agent, or Firm* — Gerry J. Elman; Elman Technology Law, P.C.

(57) ABSTRACT

A Helical Deer Rattle is disclosed. The rattle is made of two staves having tines of high-density polymer that replicates the density and mass of deer antlers. Each staff has a single helix-shaped tine. The two tines are formed so that they can be screwed together for silent transportation and easy storage. To use the rattle, a hunter strikes and rubs the two tines together to create the sound of deer antlers clashing, thus calling deer to the hunter. Each staff may have a handle with a guide groove, which holds the tine of other staff when the staves are screwed together. A cord may be included with each handle, to further assist in securing the tines to the handles of the other staff.

10 Claims, 4 Drawing Sheets

(56) References Cited

U.S. PATENT DOCUMENTS

| | | | |
|---|---|---|---|
| 8,096,849 B2 | 1/2012 | Knight | |
| 8,684,787 B1 * | 4/2014 | Burcham | A01M 31/004 446/397 |
| 8,734,198 B1 * | 5/2014 | Seldin | A63H 33/067 273/158 |
| 2004/0244152 A1 * | 12/2004 | Place | A01M 31/004 24/3.1 |
| 2008/0318488 A1 * | 12/2008 | Castner | A01M 31/004 446/26 |
| 2014/0250759 A1 | 9/2014 | Franklin | |

* cited by examiner

HELICAL DEER RATTLE

CROSS-REFERENCE TO RELATED APPLICATIONS

This application claims priority to U.S. Provisional Patent Application 62/368,861, filed Jul. 29, 2016.

BACKGROUND OF THE INVENTION

Deer rattles have become common in the pursuit of wild game. By percussively striking synthetic or natural objects together, the hunter imitates the antler sound of two male deer fighting, with the goal of luring deer within range to be taken. Deer rattles that replicate natural antler construction are large and cumbersome, making them difficult to stow, transport, and use in the field. Alternatively, smaller, more compact rattle devices are known to create excess noise and unrealistic sound.

While full size natural antler replicas create realistic tone and durability, they are difficult to store and transport afield due to size and shape. They are also difficult to master by novice hunters to create authentic deer sounds. Conversely, compact rattle systems lack the natural tone and durability of full size antler replicas.

SUMMARY OF THE INVENTION

I have invented a helical deer rattle that is easy to use, is easy to transport, and produces realistic antler-clashing sounds. The rattle is desirably made of a solid, high-density polymer, including thermoplastics, thermosetting plastics, and fiber reinforced plastics. The rattle is made of two staves, each with a solid helix-shaped tine spiraling around a hollow core in the axis of the helix. In preferred embodiments, each staff has a handle portion extending from one end of the tine. The handle has a core surrounded by a helix-shaped guide groove. The handle core may be solid or hollow.

The tines are formed so that they can be secured together. To do this, the user aligns the tip of one tine with the tip of the other tine. The user turns the staves and pushes them together, screwing the first tine together with the second tine. When the user finishes screwing the tines together, the tines are intertwined, uniting to a single, easily-transportable unit. In preferred embodiments, as the tines are being screwed together, when the tine of one staff reaches the handle of the other staff, the first staff's tine enters a guide groove on the handle of the second staff, and the second staff's tine enters a corresponding guide groove on the handle of the first staff, further securing the staves together.

To use the deer rattle, the user unscrews the tines from one another, separating the transportable unit into its two constituent staves. The user then strikes the tines together, or rubs them together, to create a sound similar to the sound of deer antlers clashing.

In preferred embodiments, there are protuberances on the exterior of the tines on the side of the helix facing away from the hollow core. These protuberances, which may be spike-shaped, protrude from the outside of the tines. These protuberances aid in producing a realistic antler-clashing sound, especially when the tines are rubbed together.

In some embodiments, an elastic cord extends from the handle of each staff. When the user secures the two tines together for transportation or storage, the user wraps the cords around the handle and the tine of the other staff, using a cord lock to create tension in the cord, further securing the tine of the other staff to the handle.

Though increasingly archaic, this document follows the standard dictionary recommendation to use "staves" as the plural of "staff".

DETAILED DESCRIPTION OF THE INVENTION

Figure 1:
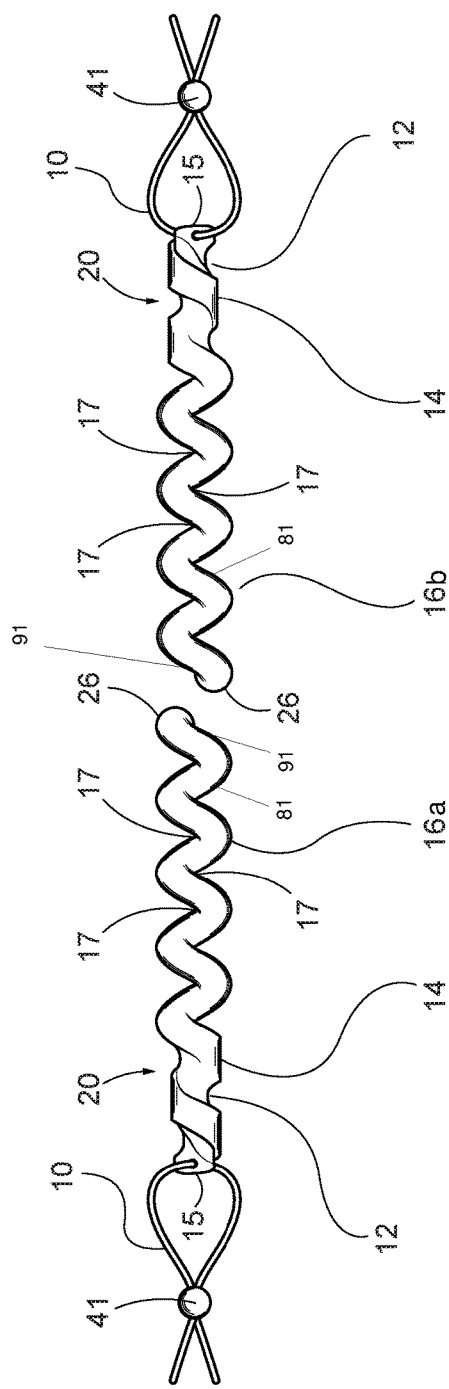
FIG. 1 is an elevation view of the two staves of the invention, showing the tips of their respective tines proximate to one another.

FIG. 1 further illustrates that the tine of each staff has an edge facing the tip 91, which this document will call the "upper edge 91", and an edge 81 facing away from the tip 26, which this document will call the "lower edge 81". In embodiments of the invention that include handles 14, the lower edge 81 faces the handle 14. Both the upper edge 91 and the lower edge 81 of the tine 16 extend over the length of the tine 16: that is, from the tine's tip 26 to its other end. In embodiments that include handles 14, the upper edge 91 and lower edge 81 extend from the tip 26 to the handle 14.

Extending from the handle 14 of each staff 20 is a tine 16. The tines 16 may be between six and ten inches long. In preferred embodiments, the tines 16 are ten inches long. The tines 16 have the shape of a helix, which provides a large sound-generating section in compact volume. The shape of the tines 16 allows them to be screwed together and intertwine with one another, securing the staves 20 together and producing a single unit 30 (see FIG. 2). The solid tines 16 extend around a hollow core 17 in the axis of the tine's helix. The hollow core 17 has a diameter of one-half inch to two inches, depending on the embodiment. In preferred embodiments, the diameter is one inch. The tine tips 26 are also illustrated.

By using helix-shaped tines 16, the invention is able to replicate natural antler sounds, while reducing overall size, weight, complexity, and unintended noise. The helical mono-tined design replicates natural antler sparring sound when struck or rubbed together.

Figure 2:
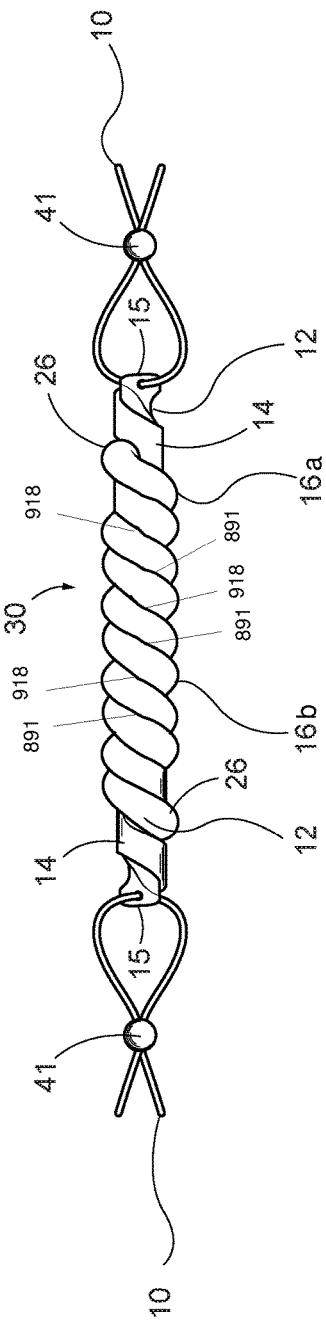
FIG. 2 is an elevation view of the two staves of the invention, screwed together for storage and transport.
Figure 4:
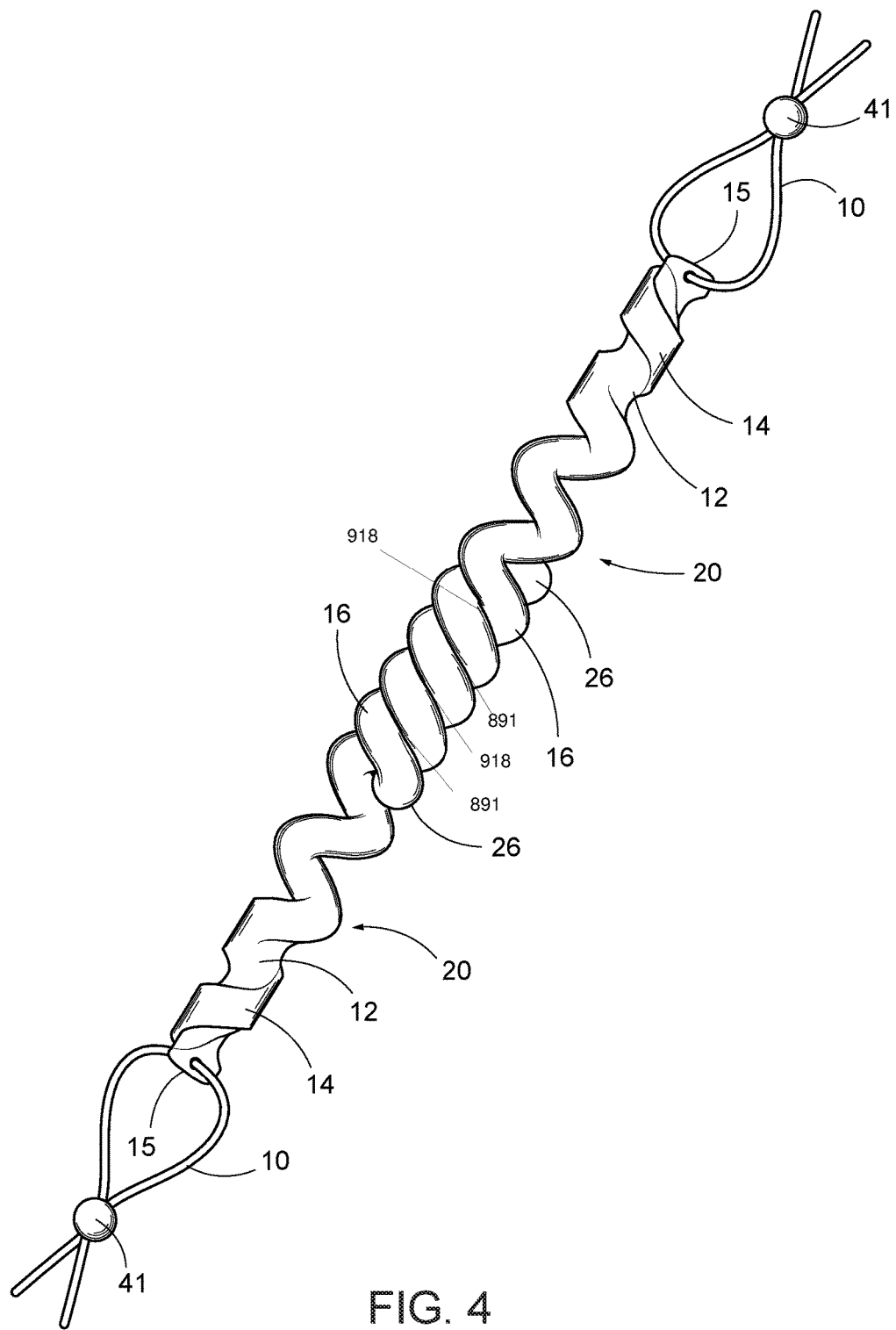
FIG. 4 is an elevation view of the two staves of the invention, in an intermediate step of the screwing or unscrewing process.

To intertwine the staves 20, the user positions the staves 20 as shown in FIG. 1, with the tine tips 26 positioned adjacent to and co-linear with one another. The user pushes the staves 20 together while turning them in a screwing motion. The tine 16a of one of the staves 20 intertwines with the tine 16b of the other staff 20. FIG. 4 illustrates the invention part of the way through the screwing process. FIG. 4 illustrates that, as the staves 20 are intertwining, the upper edge 91 of one tine 16a contacts the upper edge 91 of the other tine 16b at various upper edge contact points 918. It further illustrates that, as the staves 20 are intertwining, the lower edge 81 of one tine 16a contacts the lower edge 81 of the other tine 16b at various lower edge contact points 891. In preferred embodiments, once a tine 16 has been intertwined far enough to reach the handle 14 of the other staff 20, the tine 16 is further guided by the guide groove 12 of the other staff's handle 14 to the tine's storage & transportation position. As shown in FIG. 2, once the intertwining process is finished in the preferred embodiment, the upper edge 91 of one tine 16a contacts the upper edge 91 of the other tine 16b at various upper edge contact points 918, the lower edge 81 of one tine 16a contacts the lower edge 81 of the other tine 16b at various lower edge contact points 891, and each tine 16 rests in the guide groove 12 of the other staff's handle 14.

FIG. 2 illustrates the embodiment of the invention previously illustrated in FIG. 1, once the intertwining of the tines 16 is complete and a single unit 30 is formed. The contact between the tines 16 at the upper edge contact points 918 and lower edge contact points 891 prevents the tines 16 from striking or rubbing against one another while they are intertwined, and also obstructs separation of the tines 16 until they are unscrewed. The unit 30 is easy to transport and easy to store, and importantly, produces minimal noise during transport.

To use the deer rattle, the user unscrews the staves 20 from one another (if not already apart) and strikes and/or rubs the tine 16 of one staff 20 with the tine 16 of the other staff 20. If the cords 10 are included, the user may wrap the cords 10 around his or her wrists to prevent dropping the staves 20 during use.

Figure 3:
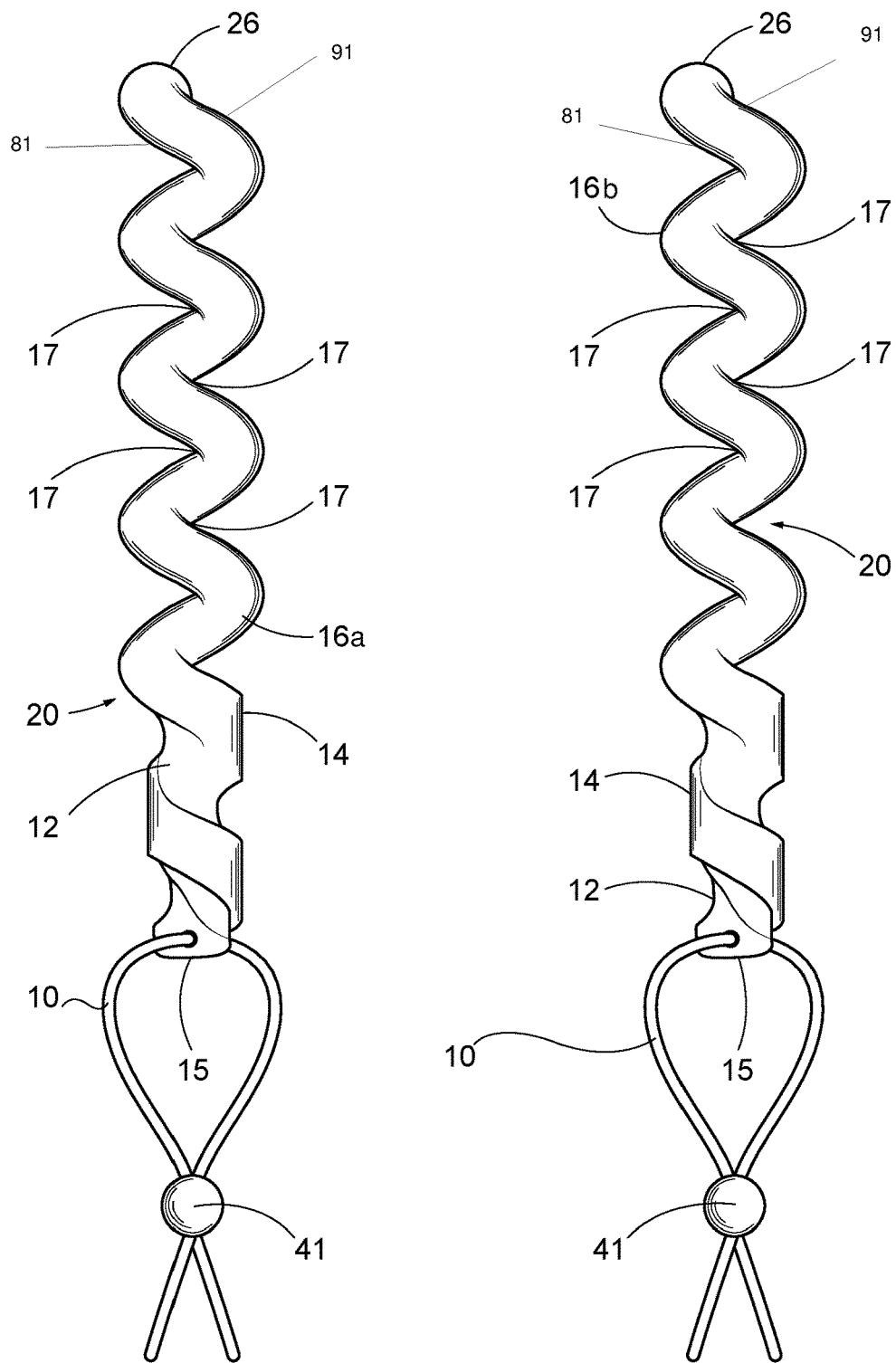
FIG. 3 is an elevation view of the two staves of the invention, separated and ready for use.

FIG. 3 shows the staves 20 apart, ready for use. FIG. 3 also illustrates the optional cords 10 and cord locks 41. In the embodiment illustrated in FIG. 3, the handle 14 is shown, with a helix-shaped guide groove 12 surrounding a handle core 15. The helix-shaped tine 16 spirals around the hollow core 17 in the axis of the tine's helix. The tine tips 26 are also illustrated.

FIG. 4 illustrates an embodiment of the invention in an intermediate stage of the screwing and unscrewing processes. The tines 16 are partially intertwined with one another; the staves 20 are being held together at this stage, but not as securely as in the completed stage (see FIG. 2). In this embodiment, the handles 14 are included on each staff 20, with the guide groove 12 surrounding a handle core 15. Additionally, the upper edges 91 and lower edges 81 of the tines 16 are illustrated. The tines 16 contact each other at the upper edge contact points 918 and lower edge contact points 891. The upper edge 91 of one tine 16 does not contact the lower edge 81 of the other. The tines 16, including their tips 26, are not in the guide grooves 12. From this stage, the user can further screw the staves 20 together to create an easily-stored and easily-transported unit 30 (see FIG. 2) or unscrew the staves 20 for use (see FIG. 3).

Figure 5:
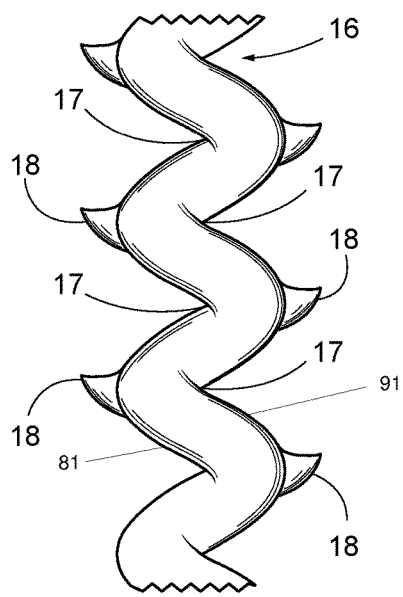
FIG. 5 is a close-up view of a preferred embodiment of the staff of the invention, illustrating the sound-enhancing protuberances.

FIG. 5 illustrates a portion of a tine 16 of a preferred embodiment of the invention. On the exterior of the tine 16, facing away from the hollow core 17, are protuberances 18. Like the tine 16 and the handle 14 (not illustrated in this Figure), the protuberances 18 are formed of high-density polymer. When the user strikes or rubs the tines 16 together, the protuberances 18 aid in creating a realistic antler-clashing sound.

Figure 6:
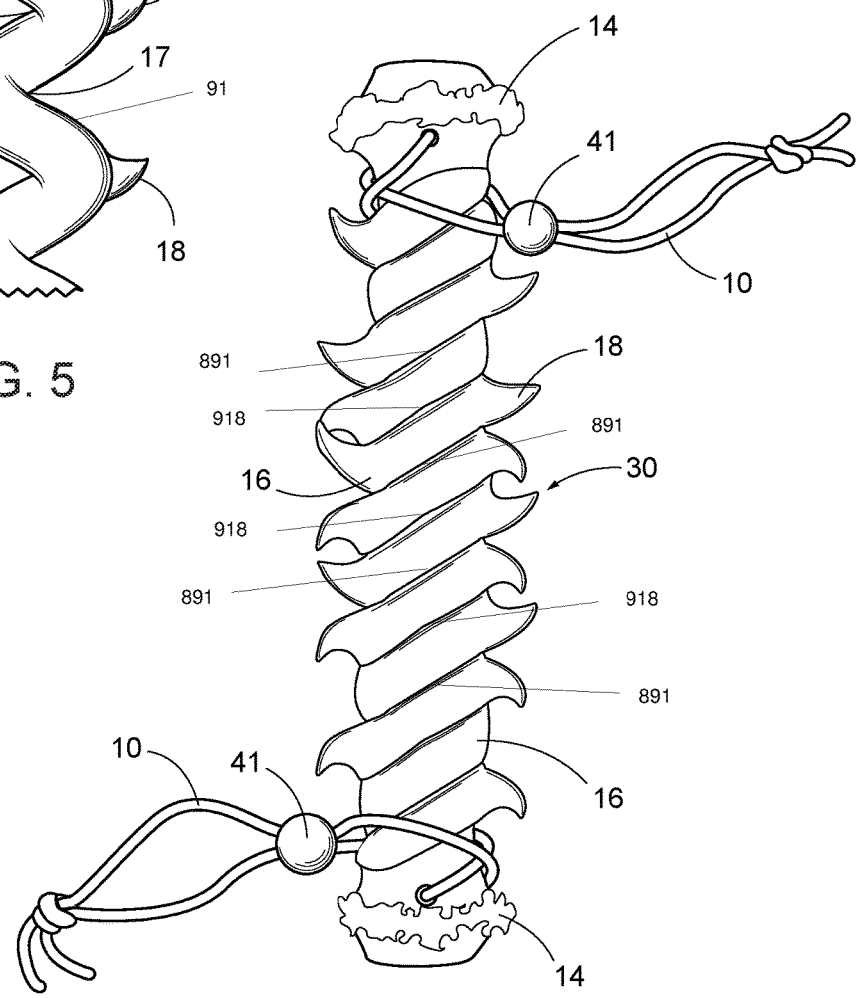
FIG. 6 is an elevation view of an embodiment of the invention, showing optional cords used to further secure the tines of the staves to the handles.

FIG. 6 illustrates the use of the optional cord 10 to retain a tine 16 to the handle 14 of the other staff 20, once the tines 16 have been screwed together to create a transportable rattle unit 30, as shown in FIG. 2. As in other embodiments, there are various upper edge contact points 918 and lower edge contact points 891 along the length of the transportable rattle unit 30. As in other embodiments, the friction generated by the contact points 891, 918 functions to secure the tines 16 together, preventing them from striking or rubbing against one another until they are unscrewed. The cord 10 has two ends, which extend from the handle 14. In this Figure, the user has twisted the cord 10 and wrapped it around the handle 14 before placing the cord 10 over the tip of the tine 26 of the other staff 20. The user then moves the cord lock 41 down the cord 10 in the direction of the handle 14. The user moves the cord lock 41 until the cord 10 is sufficiently tense to hold the tine 16 of the other staff 20 to the handle 14 of the cord's staff 20.

Other embodiments are possible. The handle 14 and the handle core 15 may be entirely omitted, and the entire staff 20 may be a helical tine 16. In such embodiments, the cord 10 and cord lock 41 would be omitted, or the cord 10 would attach to one end of the tine 16.

Additionally, the invention could be used as a percussive instrument or for tissue manipulations in physical therapy or massage.

I claim:

1. A rattle adapted to be used percussively to simulate the sound of antlers clashing or scraping, the rattle comprising:
   a first staff comprising:
      a first handle having a first handle core and a first guide groove embedded within the exterior of the first handle core, and
      a first tine extending from the first handle, the first tine formed of a solid, high density polymer in the shape of a helix, the first tine having a first hollow core, a first upper edge extending along the length of the first tine, and a first lower edge extending along the length of the first tine; and
   a second staff comprising:
      a second handle having a second handle core and a second guide groove embedded within the exterior of the second handle core, and
      a second tine extending from the second handle, the second tine formed of a solid, high density polymer in the shape of a helix, the second tine having a second hollow core, a second upper edge extending along the length of the second tine, and a second lower edge extending along the length of the second tine;
   wherein the first hollow core and the second hollow core have the same diameter;
   wherein the first tine and the second tine have the same length; and
   wherein the helix of the first tine and the helix of the second tine have the same handedness;
   wherein the first tine and the second tine are formed so that, when a tip of the first tine and a tip of the second tine are aligned with one another, the first tine and the second tine can be turned and moved towards one another so that the first tine and the second tine intertwine,
      the first upper edge in continuous contact with the second upper edge,
      the first lower edge in continuous contact with the second lower edge,
   wherein the first handle is formed so that, when the second tine has intertwined with the first tine far enough to reach the first handle, the second tine travels through the first guide groove,
   wherein the second handle is formed so that, when the first tine has intertwined with the second tine far enough to reach the second handle, the first tine travels through the second guide groove, thereby forming a single unit with minimal space between the tines and securing the first staff and second staff together.

2. The rattle of claim 1, further comprising:
a first plurality of protuberances on the exterior of the first tine; and
a second plurality of protuberances on the exterior of the second tine.

3. The rattle of claim 2, further comprising:
a first cord extending from the first handle; and
a second cord extending from the second handle.

4. The rattle of claim 1, further comprising:
a first cord extending from the first handle; and
a second cord extending from the second handle.

5. A method of calling a wild animal with a rattle, the rattle comprising:
providing the rattle of claim 1;
the method comprising:
striking the first tine against the second tine to simulate the sound of antlers clashing.

6. The method of claim 5, the rattle further comprising:
a first plurality of protuberances on the exterior of the first tine; and
a second plurality of protuberances on the exterior of the second tine.

7. The method of claim 5, further comprising:
rubbing the first tine against the second tine.

8. The method of claim 7, the rattle further comprising:
a first plurality of protuberances on the exterior of the first tine; and
a second plurality of protuberances on the exterior of the second tine.

9. A method of calling a wild animal with a rattle, the rattle comprising:
providing the rattle of claim 1;
the method comprising:
rubbing the first tine against the second tine to simulate the sound of antlers being scraped together.

10. The method of claim 9, the rattle further comprising:
a first plurality of protuberances on the exterior of the first tine; and
a second plurality of protuberances on the exterior of the second tine.

* * * * *